United States Patent
Sherman et al.

(10) Patent No.: US 6,935,609 B2
(45) Date of Patent: Aug. 30, 2005

(54) MICROVALVE FOR CONTROLLING FLUID FLOW

(75) Inventors: Faiz Feisal Sherman, West Chester, OH (US); Vladimir Gartstein, Cincinnati, OH (US); Daniel Jonathan Quiram, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 97 days.

(21) Appl. No.: 10/777,741

(22) Filed: Feb. 12, 2004

(65) Prior Publication Data

US 2004/0159813 A1 Aug. 19, 2004

Related U.S. Application Data

(63) Continuation of application No. 10/048,083, filed as application No. PCT/US00/19786 on Jul. 20, 2000.
(60) Provisional application No. 60/175,152, filed on Jan. 7, 2000, and provisional application No. 60/146,625, filed on Jul. 30, 1999.

(51) Int. Cl.$^7$ .......................... F16K 31/44; F16K 25/00
(52) U.S. Cl. ..................... 251/76; 251/208; 251/248; 251/250; 251/301; 251/129.01
(58) Field of Search ................. 251/76, 129.01, 251/205, 208, 248, 250, 250.5, 286, 298, 301; 138/46

(56) References Cited

U.S. PATENT DOCUMENTS

| | | | |
|---|---|---|---|
| 2,468,430 A | 4/1949 | Derksen | |
| 3,838,299 A | 9/1974 | Elkuch | |
| 4,177,327 A | 12/1979 | Mathews et al. | |
| 4,913,983 A | 4/1990 | Cheiky | |
| 5,054,522 A | 10/1991 | Kowanz et al. | |
| 5,178,190 A | 1/1993 | Mettner | |
| 5,304,431 A | 4/1994 | Schumm, Jr. | |
| 5,400,824 A | 3/1995 | Gschwendtner et al. | |
| 5,449,569 A | 9/1995 | Schumm, Jr. | |
| 5,541,016 A | 7/1996 | Schumm, Jr. | |
| 5,631,514 A | 5/1997 | Garcia et al. | |
| 5,837,394 A | 11/1998 | Schumm, Jr. | |
| 5,873,562 A * | 2/1999 | Marugg | 251/301 |
| 6,074,775 A | 6/2000 | Gartstein et al. | |
| 6,163,131 A | 12/2000 | Gartstein et al. | |
| 6,290,862 B1 * | 9/2001 | Silverbrook | 216/27 |

FOREIGN PATENT DOCUMENTS

| | | |
|---|---|---|
| EP | 0 829 649 A2 | 3/1998 |
| WO | WO 99/16096 A1 | 4/1999 |
| WO | WO 99/37013 A1 | 7/1999 |
| WO | WO 01/09519 A1 | 2/2001 |
| WO | WO 01/09520 A1 | 2/2001 |

OTHER PUBLICATIONS

Ernest J. Garcia and Jeffry J. Sniegowski, "Surface Micromachined Microengine," Elsevier Science S.A., Feb. 7, 2005, pp. 203–214.
Faiz Sherman, et al, "In–Plane Microactuator for Fluid Control Application," The Eleventh Annual International Workshop on Micro Electro Mechanical Systems, Jan. 1998.
Lee A. P. et al, "Polyslllon Angular Microvibromotors," Journal of Microelectromechanical Systems, Jun. 1, 1992, pp. 70–76, vol. 1, No. 2, New York.
Tien N. C. et al, "Impact–Actuated Linear Microvibromotor for Micro–Optical Systems On Sillcon," Technical Digest of the International Electron Devices Meetings, Oct. 22, 1995, pp. 924–926, vol. Meeting 40, New York.

* cited by examiner

*Primary Examiner*—Edward K. Look
*Assistant Examiner*—John K. Fristoe, Jr.
(74) *Attorney, Agent, or Firm*—Peter D. Meyer

(57) ABSTRACT

A microvalve for controlling fluid flow, including a body portion having at least one opening formed therein, a shutter located adjacent to and substantially parallel with the body portion, and a drive mechanism for causing the shutter to pivot with respect to the body portion so that the shutter is brought into and out of alignment with the opening of the body portion, wherein the microvalve is in a closed position and an open position, respectively.

20 Claims, 10 Drawing Sheets

MICROVALVE FOR CONTROLLING FLUID FLOW

CROSS-REFERENCE TO RELATED APPLICATIONS

This application is a continuation of U.S. application Ser. No. 10/048,083, filed Jan. 24, 2002, which claims priority to PCT application PCT/US00/19786 filed on Jul. 20, 2000, which claims the benefit of U.S. Provisional Application No. 60/175,152, filed Jan. 7, 2000 and U.S. Provisional Application No. 60/146,625, filed Jul. 30, 1999.

FIELD OF THE INVENTION

This invention relates to a microvalve for controlling fluid flow, and more particularly, to a shutter utilized in such microvalve which is pivotable between open and closed positions by one or more comb drives.

BACKGROUND OF THE INVENTION

Microvalves employed to control the flow of fluid are presently in use, with several designs falling within a class known as micro electromechanical systems or "MEMS." It will be appreciated that such microvalves are preferably driven thermally or electrostatically. In either case, slots or other types of openings are placed in an open or closed position, respectively, preferably within a shutter-type configuration so as to permit or prevent fluid from flowing therethrough. Typically, prior art microvalves involve lateral movement of the shutter which is linear. Lateral movement of the shutter may also be non-linear (i.e., rotational), as disclosed in a separate provisional patent application entitled "Microvalve For Controlling Fluid Flow," having Ser. No. 60/146,625, which is owned by the assignee of the present invention and hereby incorporated by reference. In this way, the amount of opening can be maximized by a minimal amount of movement. To eliminate the need for continuous power to such microvalves, latching systems are preferably employed to maintain the shutter in position.

One example of latching is disclosed in U.S. Pat. No. 5,837,394 to Schumm, Jr., where a detent or ratchet is provided to assist in holding a sliding portion of a semiconductor microactuator in either the open or closed position. As seen therein, though, separate actuators are utilized to move the sliding portion in each direction. In this way, the actuators must overcome the resistance provided by the detent/ratchet so that the sliding portion is able to move into the desired position. This clearly requires a greater force from the actuators, and therefore a greater amount of power to the actuators. Further, it will be seen that the '394 patent relates specifically to electrically activated, thermally responsive semiconductor valves that include and contain a cantilever deformable element which deforms on heating by electrical resistance.

It will further be appreciated that while microvalves of the type disclosed herein may be utilized in any number of environments, one specific application has been in the field of metal-air batteries. Metal-air batteries have decided advantages over other types of electrochemical cells such as typical alkaline (zinc/manganese dioxide) or lithium batteries. The metal-air batteries utilize a gas reactant, such as oxygen or air, which does not have to be stored in the battery like a solid reactant. The gas reactant may enter the cell through vents or holes in the battery case. Thus, metal-air batteries are able to provide a higher energy density (watts per unit mass) that may result in a relatively higher power output and a relatively lower weight. This is particularly useful in applications in which a small, light battery is desired so that more energy is provided in the same size package or the same amount of energy in a smaller package. Metal-air batteries are also environmentally safe and generally leakage-free.

Metal-air batteries are comprised of one or more electrochemical cells. Each cell typically includes a metal anode and an air cathode with a separator electrically isolating the two, where an electrolyte is present in the anode, cathode and separator. The metal anode usually comprises a fine-grained metal powder, such as, but not limited to, zinc, aluminum or magnesium, blended together with an aqueous electrolyte, such as potassium hydroxide, and a gelling agent into a paste. The air cathode is a catalytic structure designed to facilitate the reduction of oxygen and typically comprises active carbon, a binder and a catalyst, which are formed into a sheet together with a metal current collector. The air cathode also commonly incorporates a hydrophobic polymer, such as polytetrafluoroethylene or polypropylene, directly into the cathode sheet and/or as a coextensive film. The hydrophobic polymer prevents the electrolyte from passing through the cathode and leaking from the cell.

In a metal-air battery, oxygen, through a series of reactions, reacts with the metal in the cell producing electrical current. In a zinc-air cell, for example, oxygen enables a charge/discharge reaction at the cathode (positive electrode):

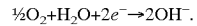
$\frac{1}{2}O_2 + H_2O + 2e^- \rightarrow 2OH^-$.

Meanwhile, a charge/discharge reaction occurs at the anode (negative electrode):

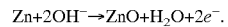
$Zn + 2OH^- \rightarrow ZnO + H_2O + 2e^-$.

Hence, the zinc-air cell has an overall reaction:

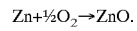
$Zn + \frac{1}{2}O_2 \rightarrow ZnO$.

Typically, metal-air batteries utilize ambient air, which contains approximately 21% oxygen, as the reactant for the cells. The ambient air enters through ventilation holes in the housing. In the housing, the oxygen in the ambient air reacts with the cells. The oxygen-depleted air then exits the housing. Thus, ambient air enters or is drawn into the housing in a flow sufficient to achieve the desired power output.

Free flow of ambient air through the metal-air cell, however, creates several problems that may lower the efficiency of a metal-air cell or even cause the cell to fail prematurely. First, ambient air that enters the electrochemical cell will continue to react with the anode regardless of whether the cell is providing electrical energy to a load. Thus, the capacity of the cell will continue to decrease unless air is excluded while the cell is not providing electrical energy to a load. Another problem with allowing free flow of ambient air as the reactant is the difficulty in maintaining the proper humidity in the battery. Equilibrium vapor pressure of the metal-air battery results in an equilibrium relative humidity that is typically about 50–60%. If the ambient humidity is greater than the equilibrium relative humidity value for the metal-air battery, the metal-air battery will absorb water from the air through the cathode and fail due to a condition called flooding, which may also cause the battery to leak. If the ambient humidity is less than the equilibrium relative humidity value for the metal-air battery, the metal-air cells will release water vapor from the electrolyte through the air cathode and fail due to drying out.

Further, impurities such as carbon dioxide ($CO_2$) present in the ambient air may decrease the energy capacity of the cell. Thus, a metal-air cell will operate more efficiently and longer if the flow of ambient air is controlled so that the air enters the cell only when the cell is providing electrical energy to a load.

Air exchange control systems for metal-air batteries have been designed to control the flow of ambient air into and out of metal-air cells for the following reasons: (1) to prevent the cell from continuing to react; (2) to prevent changes in the cell humidity; and, (3) to prevent $CO_2$ from entering the cell when the battery is not providing electrical energy to a load. Some designs, for example, use a mechanism physically operated by the user where a valve or vent cover is attached to a switch that turns an electrical device "on" so that when the switch moves, the cover moves. See, e.g., U.S. Pat. No. 2,468,430, issued to Derksen on Apr. 26, 1949; U.S. Pat. No. 4,913,983 entitled "Metal-Air Battery Power Supply" and issued to Cheiky on Apr. 3, 1990; and, H. R. Espig & D. F. Porter, Power Sources 4: Research and Development in Non-Mechanical Electrical Power Sources, Proceedings of the 8$^{th}$ International Symposium held at Brighton, September 1972 (Oriel Press) at p. 342. In these designs, however, the air exchange system requires the physical presence of the operator and an electrical device that has a switch compatible with the battery air exchange system.

Automatic air exchange systems that are contained within the battery and operate without the presence of a user, however, typically provide significant parasitic drains on the energy capacity of the cell that may also shorten the life of the cell. One design, such as the one disclosed in U.S. Pat. No. 4,177,327 entitled "Metal-Air Battery Having Electrically Operated Air Access Vent Cover" and issued to Mathews et al. on Dec. 4, 1979, utilizes a vent cover associated with an electrically operated bimetallic actuator to close the air access vents to prevent ambient air from entering the housing when the battery is not in use. This is accomplished by applying a current to the bimetallic actuator so that the two materials thereof heat up, whereby the different thermal expansion coefficients thereof cause the system to bend up or down. The electrical actuator, however, provides a substantial parasitic drain on the metal-air cells and diminishes the life of the cell.

Additionally, U.S. Pat. No. 5,304,431 entitled "Fluid Depolarized Electrochemical Battery with Automatic Valve" and issued to Brooke Schumm, Jr. on Apr. 19, 1994; U.S. Pat. No. 5,449,569 entitled Fluid Depolarized Battery with Improved Automatic Valve" and issued to Brooke Schumm, Jr. on Sep. 12, 1995; and U.S. Pat. No. 5,541,016 entitled "Electrical Appliance with Automatic Valve Especially for Fluid Depolarized Electrochemical Battery" and issued to Brooke Schumm, Jr. on Jul. 30, 1996 disclose a design incorporating a thermally responsive semiconductor microactuator disposed over a fluid entrance inlet to permit ambient air to enter the cell when the battery is supplying electrical power to a load. In this design, electrical energy on the order of milliwatts is dissipated to heat a resistive element that opens a thermally responsive valve and keeps that valve open while the battery is in use. Thus, as described hereinabove with respect to the '394 patent, the design also provides a continuous parasitic drain on the cell that decreases the life of the cell.

Therefore, there exists a need for a microvalve, particularly one utilized as an air exchange system in a metal-air battery, that eliminates the need for a latching system while still minimizing the power drain on the cell during operation. There also exists a need to minimize the size of microvalves used with a metal-air battery so that it fits within a standard battery package and maximizes the volume of the battery that is available for providing electrical energy. It is also desirable that such microvalves be mass produced to decrease costs, as well as enable large numbers of batteries to be assembled containing them as an air exchange system.

SUMMARY OF THE INVENTION

In a first embodiment of the present invention, a microvalve for controlling fluid flow is disclosed as including: a body portion having at least one opening formed therein; a shutter located adjacent to and substantially parallel with the body portion; and, a drive mechanism for causing the shutter to pivot with respect to the body portion so that the shutter is brought into and out of alignment with the opening of the body portion, wherein the microvalve is in a closed position and an open position, respectively. The drive mechanism of the microvalve further includes a first impact comb drive for causing the shutter to pivot in a clockwise direction and a second impact comb drive for causing the shutter to pivot in a counter-clockwise direction. First and second stoppers are provided to limit pivoting of the shutter in the clockwise and counter-clockwise directions, respectively.

In a second embodiment of the present invention, a microvalve for controlling fluid flow is disclosed as including: a body portion having at least one opening formed therein; a shutter located adjacent to and substantially parallel with the body portion; and, a drive mechanism for causing the shutter to pivot with respect to the body portion so that the shutter is brought into and out of alignment with the opening of the body portion, wherein the microvalve is in a closed position and an open position, respectively. The drive mechanism of the microvalve includes at least one actuator, a rotation gear hub located adjacent to and driven by the actuator, and a rotation gear operatively connected to the shutter and the rotation gear hub, wherein the rotation gear hub is caused to rotate upon being driven by the actuator so that the rotation gear and the shutter rotate and pivot, respectively. The drive mechanism may alternatively include a linear gear operatively connected to the rotation gear hub at a first end and operatively connected to the rotation gear at a second end so that rotation of the rotation gear hub indirectly causes the rotation gear to rotate and the shutter to pivot.

In a third embodiment of the present invention, a fluid-breathing voltaic battery is disclosed as including a container, a voltaic cell disposed within the container, and a fluid exchange system. The fluid exchange system further includes a microvalve having a first state and a second state, wherein the microvalve is disposed in the container such that the microvalve is adapted to allow a fluid into the cell when the microvalve is in the first state and to substantially prevent the fluid from flowing into the cell when the microvalve is in the second state, and a controller electrically connected to the microvalve, wherein the controller is adapted to initiate a change of state in the microvalve. The microvalve further includes a body portion having at least one opening formed therein, a shutter located adjacent to and substantially parallel with the body portion, and first and second comb drives for causing the shutter to pivot with respect to the body portion so that the shutter is brought into and out of alignment with the opening of the body portion.

BRIEF DESCRIPTION OF THE DRAWINGS

While the specification concludes with claims particularly pointing out and distinctly claiming the subject matter that is regarded as the present invention, it is believed that the invention will be better understood from the following description, which is taken in conjunction with the accompanying drawings:

DETAILED DESCRIPTION OF THE INVENTION

A preferred embodiment of the present invention involves an electrostatically-driven MEMS microvalve designed to control fluid flow. In this application, the term "electrostatically-driven" refers to a driving mechanism created from fixed charge due to an electrostatic potential between two surfaces. This differs from a "thermally-driven" microvalve in that the thermally-driven microvalve utilizes a resistive element that provides the heat energy necessary to drive the valve. Such a resistive element either provides a parasitic drain on the cell itself or requires an alternative power source to drive the valves. Magnetic or inductive systems, by contrast, use continuous current in a loop to generate an external magnetic field which in turn creates a magnetic force. An electrostatic valve, however, utilizes the charge of the cell to drive the valve so that the parasitic drain on the cell is much less than for thermal or magnetic valves.

Figure 1:
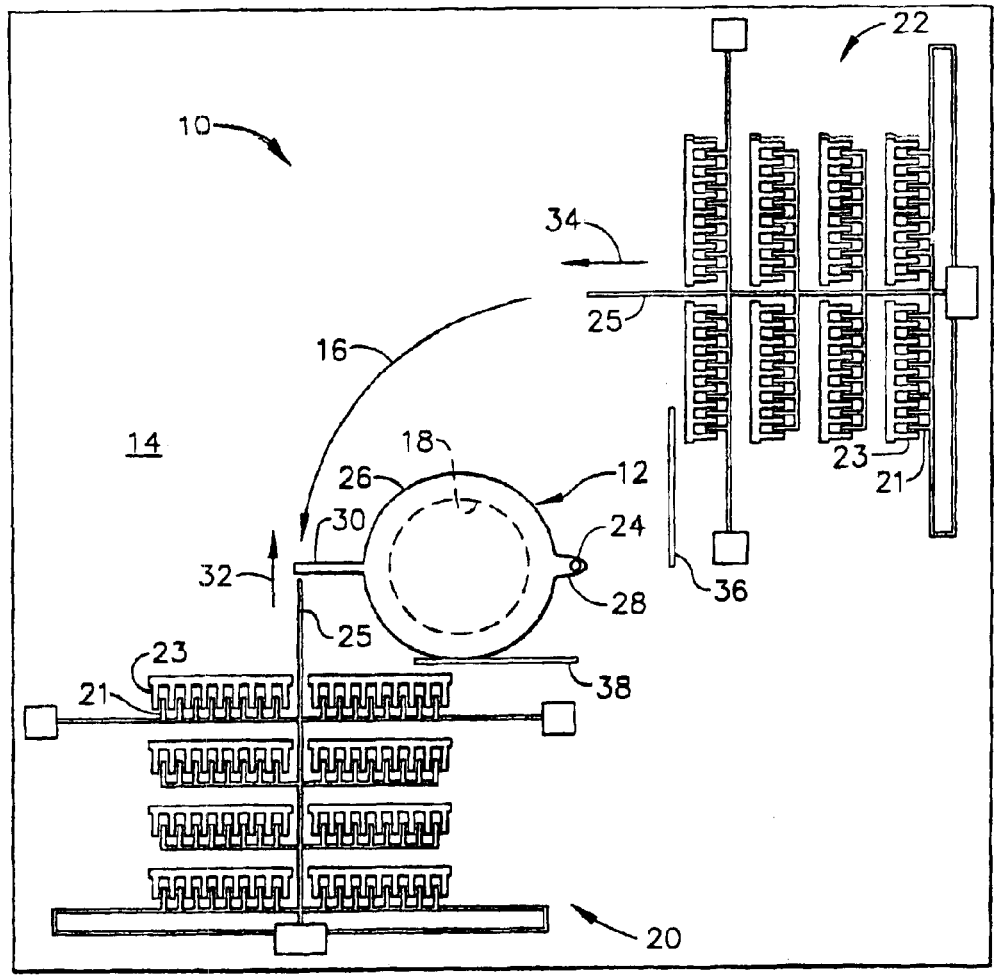
FIG. 1 is a schematic top view of a microvalve in accordance with the present invention, where the shutter is in the closed position.

In the preferred embodiments, the microvalve is designed to consume power only during transients, i.e., while changing states from open to closed or vice versa. More specifically, it will be seen in FIGS. 1 and 2 that a microvalve, denoted generally by reference number 10, preferably includes a shutter 12 located adjacent to and substantially parallel with a body portion 14, where body portion 14 preferably has at least one opening 18 formed therein (see FIG. 3). Shutter 12, by contrast, does not have any large openings formed therein corresponding to body opening 18. Shutter 12 does, however, preferably include a plurality of smaller openings 15 which permit a predetermined amount of leakage flow through shutter 12 when in the closed position as discussed further herein (see FIG. 2). It will further be seen that microvalve 10 includes a drive mechanism, preferably in the form of impact comb drives 20 and 22, to pivot shutter 12 with respect to body portion 14 so that shutter 12 is brought into and out of alignment with opening 18 of body portion 14, wherein microvalve 10 is in a closed position and an open position, respectively. It will be appreciated that the pivotal movement of shutter 12 involves shutter 12 travelling in an arcuate manner (represented by arrow 16) about a pivot point 24. As seen in FIG. 1, shutter 12 is in the closed position (i.e., shutter 12 is aligned with opening 18 in body portion 14 so as to substantially prevent fluid flow therethrough) and must pivot in a clockwise motion to be located in the open position depicted in FIG. 2. Conversely, shutter 12 must pivot in the counter-clockwise direction to go back to the closed position. In order to prevent shutter 12 from pivoting too far in the clockwise or counter-clockwise directions, first and second stoppers 36 and 38 prevent shutter 12 from contacting impact comb drives 20 and 22. Stoppers 36 and 38 also assist in maintaining shutter 12 in a position where it can be struck by impact comb drive 20 or impact comb drive 22 when a change in position is desired.

Shutter 12 is preferably substantially circular in shape and includes a main circular portion 26, an elongated portion 28 extending from main circular portion 26 about which shutter 12 is pivoted at pivot point 24, and an impact portion 30 extending from main circular portion 26 substantially opposite pivot point 24. While shutter 12 is shown as being circular in configuration, it will be understood that any shape may be utilized provided shutter 12 aligns with opening 18 in body portion 14 when in the closed position and does not align with such opening 18 when in the open position. In this way, a relatively large overall valve opening may be obtained by pivoting shutter 12 a relatively short distance. Such a design minimizes the power necessary to drive microvalve 10 by minimizing the distance shutter 12 needs to be displaced. This, in turn, allows the use of electrostatic driving technologies such as MEMS when the power required to drive microvalve 10 is lowered to a level that may be practically delivered by these technologies.

Figure 4:
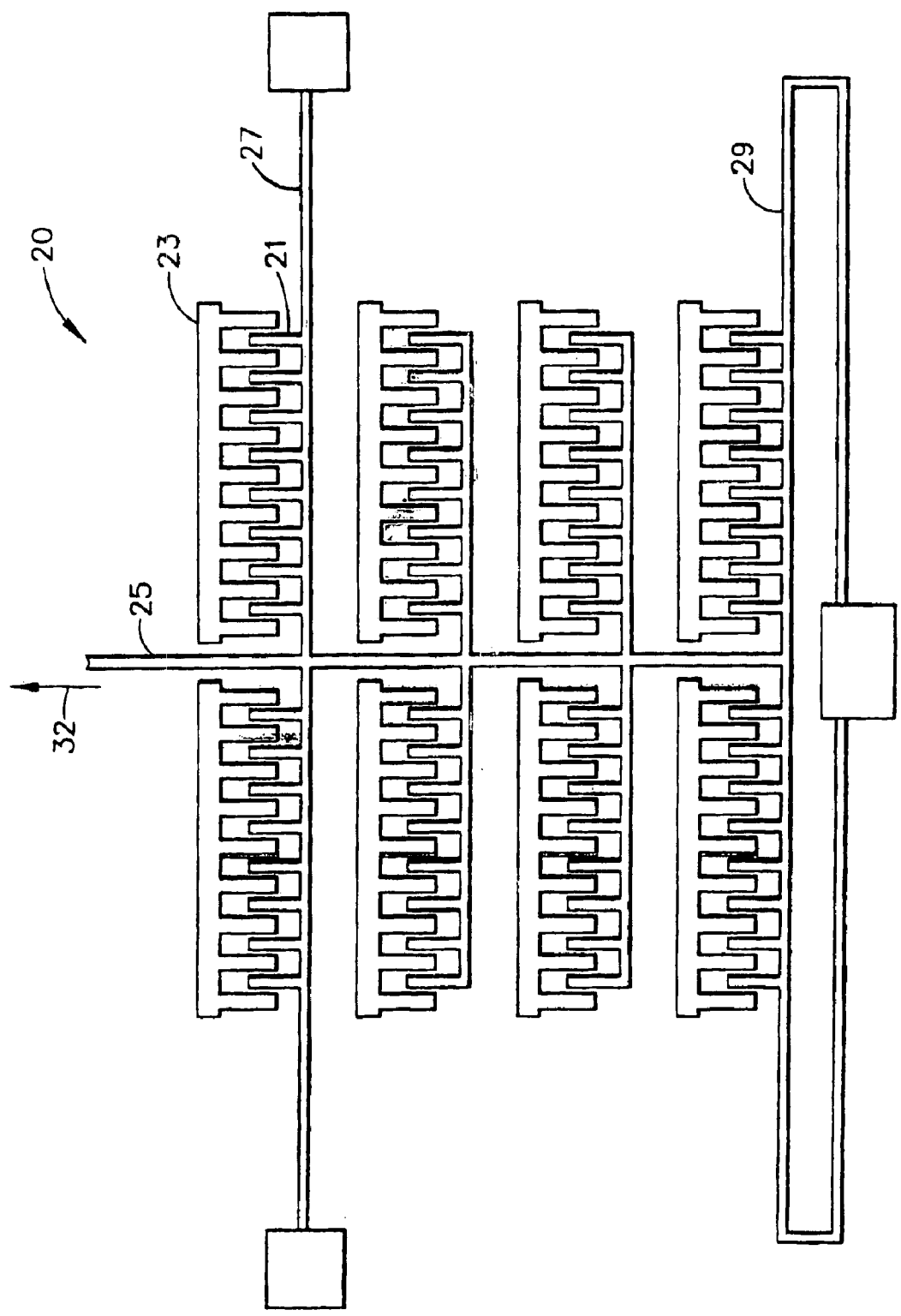
FIG. 4 is an enlarged schematic view of one of the comb drives depicted in FIGS. 1–2.

It will be appreciated that while impact comb drives 20 and 22 of the drive mechanism are preferably electrostatic in design, a thermal, magnetic or piezoelectric driving mechanism as is known in the art may be utilized. It will be understood from FIGS. 1 and 2 that impact comb drives 20 and 22 of the drive mechanism are positioned with respect to shutter 12 so as to contact an impact portion 30 thereof when caused to move in the directions represented by arrows 32 and 34, respectively, in FIGS. 1 and 2. More specifically, as seen in FIG. 4, each impact comb drive 20 and 22 further includes a plurality of suspended ground fingers 21 and a plurality of anchored fingers 23, wherein ground fingers 21 are pulled to anchored fingers 23 when a potential is applied therebetween to create an electrostatic force. Further, an impact beam 25 is provided with each electrostatic comb drive 20 and 22. It will be seen that impact beams 25 are connected in substantially parallel orientation to ground fingers 21 so that they move in the direction of arrows 32 and 34, as applicable. First and second resilient beams 27 and 29 are also connected to impact beam 25 and are anchored so as to suspend comb drives 20 and 22. In this way, impact beam 25 and ground fingers 21 are able to move back and forth absent any friction forces thereon. In this application, the term "resilient beams" refer to mechanical structures that undergo displacement so as to provide a spring-like restoring force on the whole system.

An important factor in driving shutter 12 appropriately is impact beam 25 striking impact portion 30 of shutter 12 with a force so as to cause pivoting to the desired position (i.e., adjacent a first stopper 36 for the open position or adjacent a second stopper 38 for the closed position). Thus, it will be appreciated that such force will be at least a minimum force that causes shutter 12 to pivot from one position to the other and less than a maximum force which causes shutter 12 to rebound off the applicable stopper in a position where impact beam 25 of neither impact comb drive 20 nor impact comb drive 22 is able to contact impact portion 30 of shutter 12. While the maximum force provided by impact comb drives 20 and 22 occurs when driven at resonance, the force applied by impact comb drives 20 and 22 may be controlled by varying the voltage applied thereto. It will also be understood that the force applied by impact comb drives is a function of the speed at which impact beam 25 of impact comb drives 20 and 22 strike shutter impact portion 30, the distance therebetween, and the friction encountered by shutter 12 during the pivoting motion.

Figure 3:
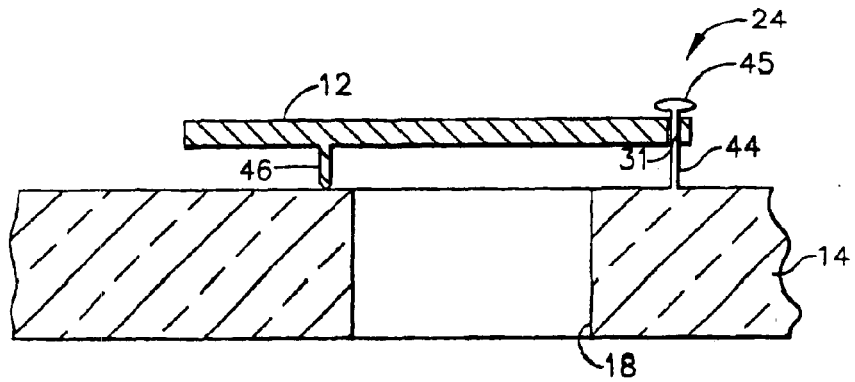
FIG. 3 is a schematic side view of the microvalve depicted in FIGS. 1 and 2.

In order for shutter 12 to be pivotable about pivot point 24 with a minimum of frictional forces thereon, it will be seen in FIG. 3 that shutter 12 is supported at pivot point 24 by a pivot support 44. More specifically, elongated portion 28 of shutter 12 includes an opening 31 therein which fits over pivot support 44 and is retained in position by a cap 45. Thus, pivot support 44 remains stationary as shutter 12 pivots therearound. Further, a dimple 46 is provided at a distal end of shutter 12 which also serves to restrict air flow between shutter 12 and body portion 14. It will be appreciated that dimple 46 extends from a lower surface of shutter 12 and is located about the circumference of shutter 12.

As stated previously, it is preferred that shutter 12 (which is preferably made of a polysilicon material) include a plurality of small openings 15 therein to permit a predetermined amount of leakage flow through shutter 12 when in the closed position. Openings 15 serve a dual purpose in that they may be used to provide an acid (e.g., hydrofluoric acid) and thus release an initial oxide layer between shutter 12 and body 14 (preferably made of silicon) as is known in the art. In this way, oxide release is accomplished in a more uniform manner than merely along the sides. Thus, the size and configuration of shutter openings 15 is designed to as to maximize the dual functions of leakage flow and uniformity of oxide release. It will also be understood that additional leakage flow control may be performed by altering dimple 46 so as to extend only partially around the circumference of shutter 12, such as in arcuate segments.

Figure 2:
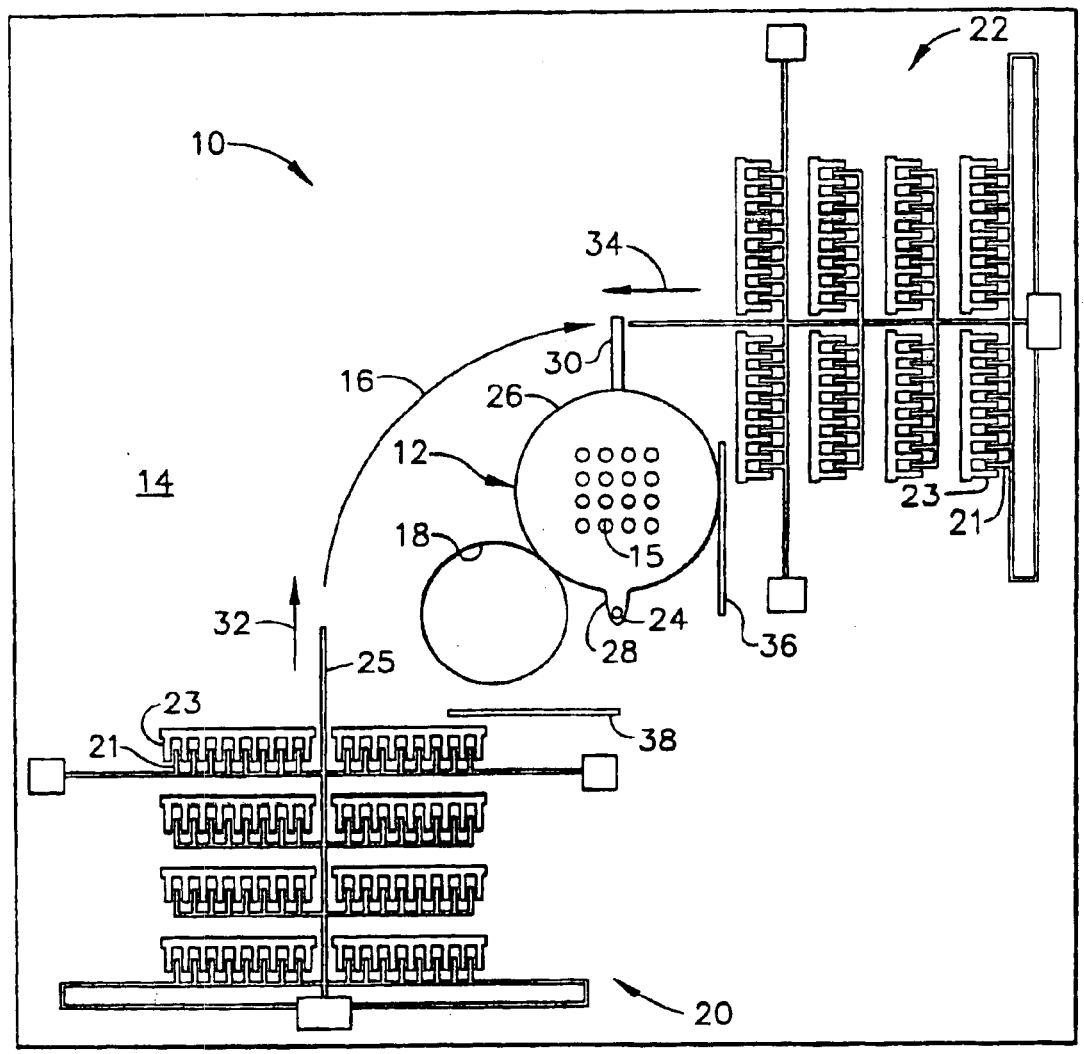
FIG. 2 is a schematic top view of the microvalve depicted in FIG. 1, where the shutter is in the open position.

In operation, it will be appreciated from FIGS. 1–2 that microvalve 10 is electrostatically actuated between a first (closed) position and a second (open) position by creating an electrostatic force between ground fingers 21 and anchored fingers 23 in impact comb drive 20 so that impact beam 25 strikes shutter impact portion 30 with force sufficient to pivot shutter 12 clockwise about pivot point 24 to a position adjacent first stopper 36. Correspondingly, microvalve 10 is electrostatically actuated from the open position to a closed position by creating an electrostatic force between ground fingers 21 and anchored fingers 23 in impact comb drive 22 so that impact beam 25 thereby strikes shutter impact portion 30 with force sufficient to pivot shutter 12 counter-clockwise about pivot point 24 to a position adjacent second stopper 38. It will be understood, then, that power is supplied to impact comb drive 20 or impact comb drive 22 only during a change in position of shutter 12 (which lasts no longer than approximately one millisecond).

Figure 5:
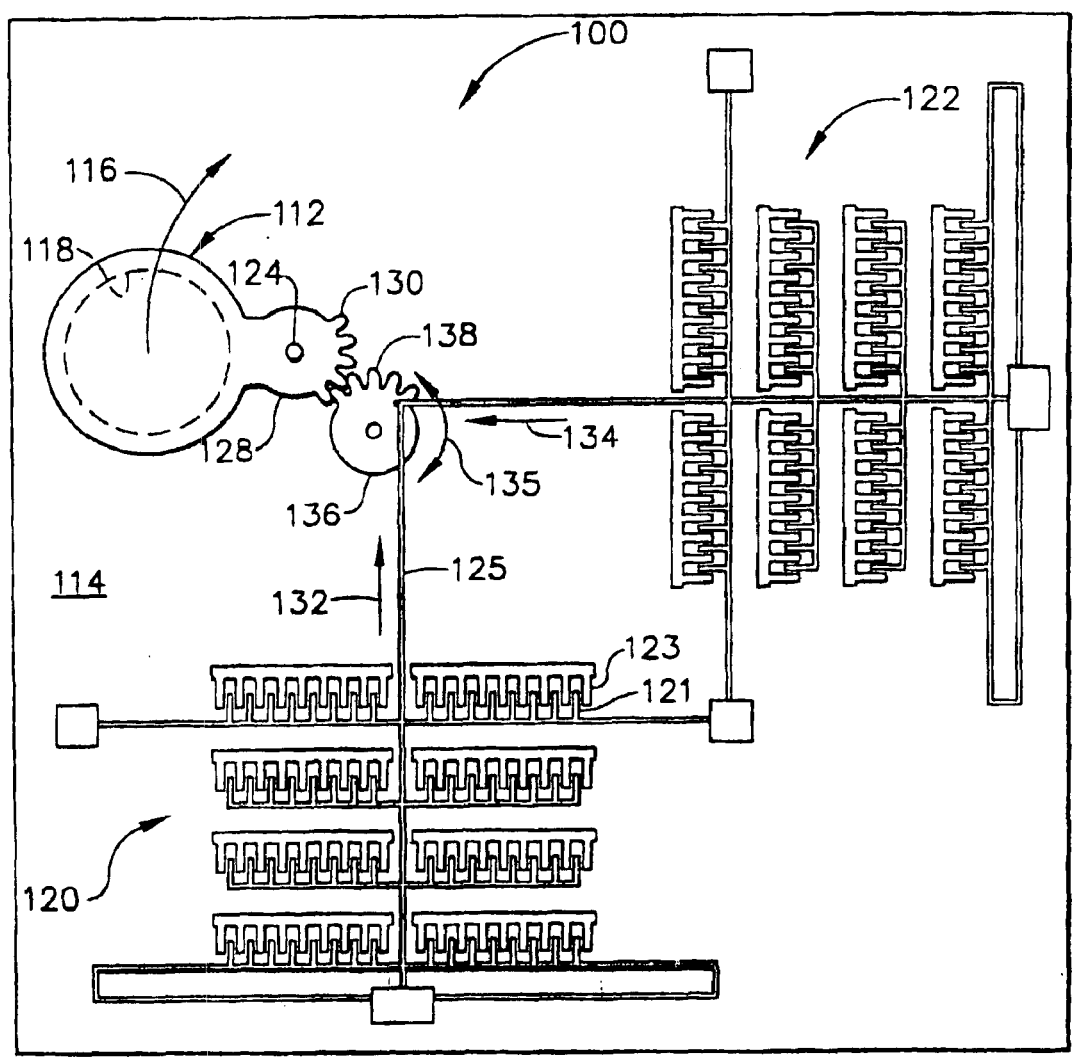
FIG. 5 is a schematic top view of a second embodiment for the microvalve of the present invention, where the shutter is in the closed position.
Figure 6:
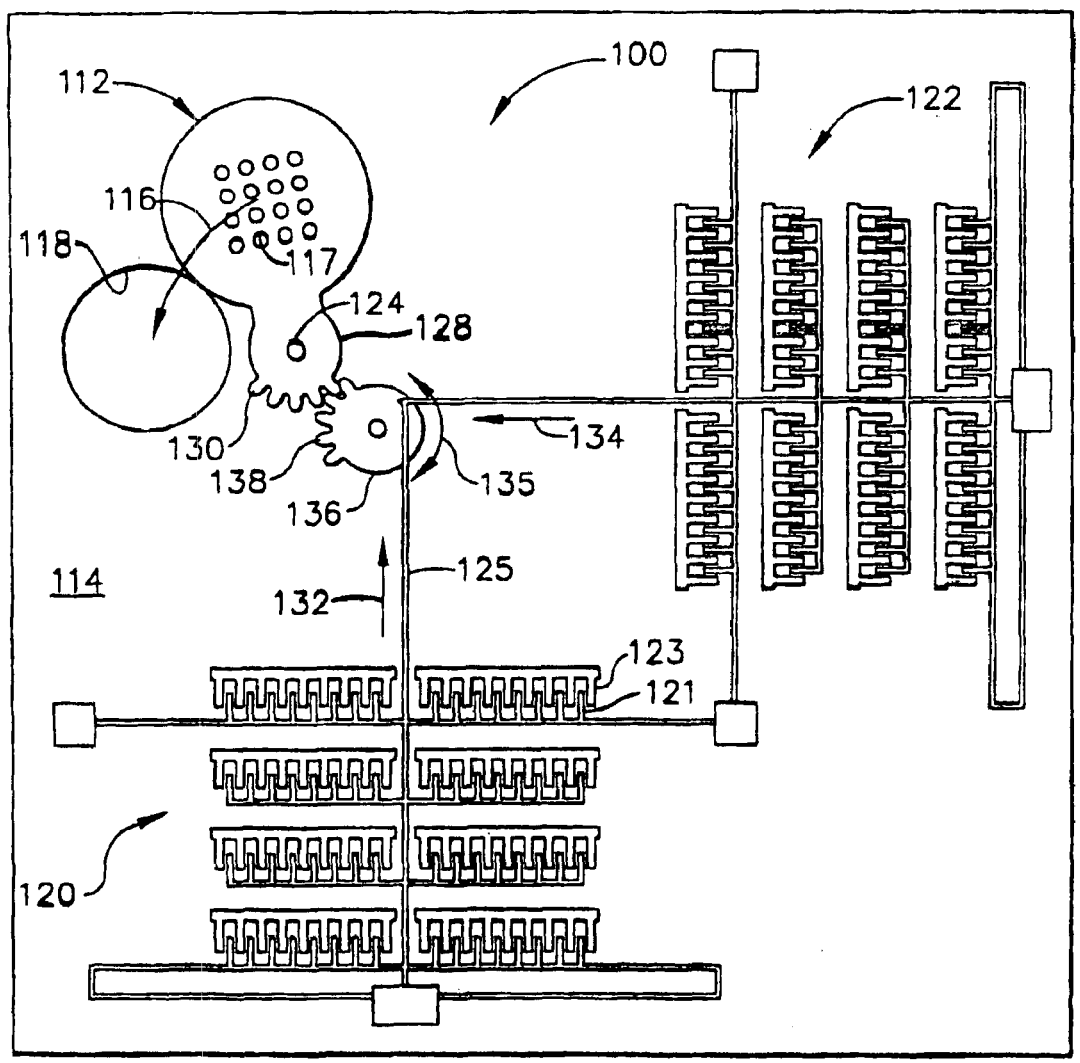
FIG. 6 is a schematic top view of the microvalve depicted in FIG. 5, where the shutter is in the open position.
Figure 7:
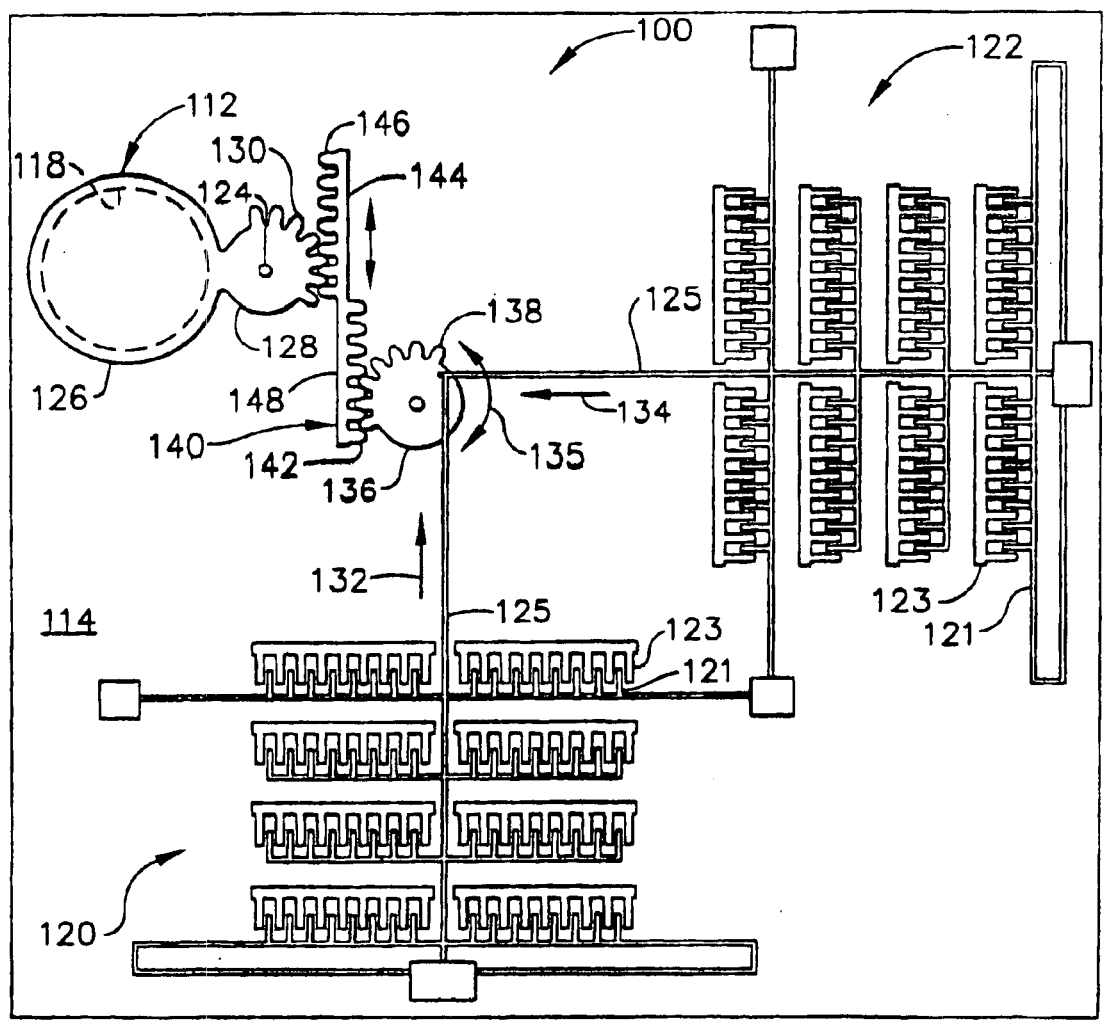
FIG. 7 is a schematic top view of a third embodiment for the microvalve of the present invention, where the shutter is in the closed position.
Figure 8:
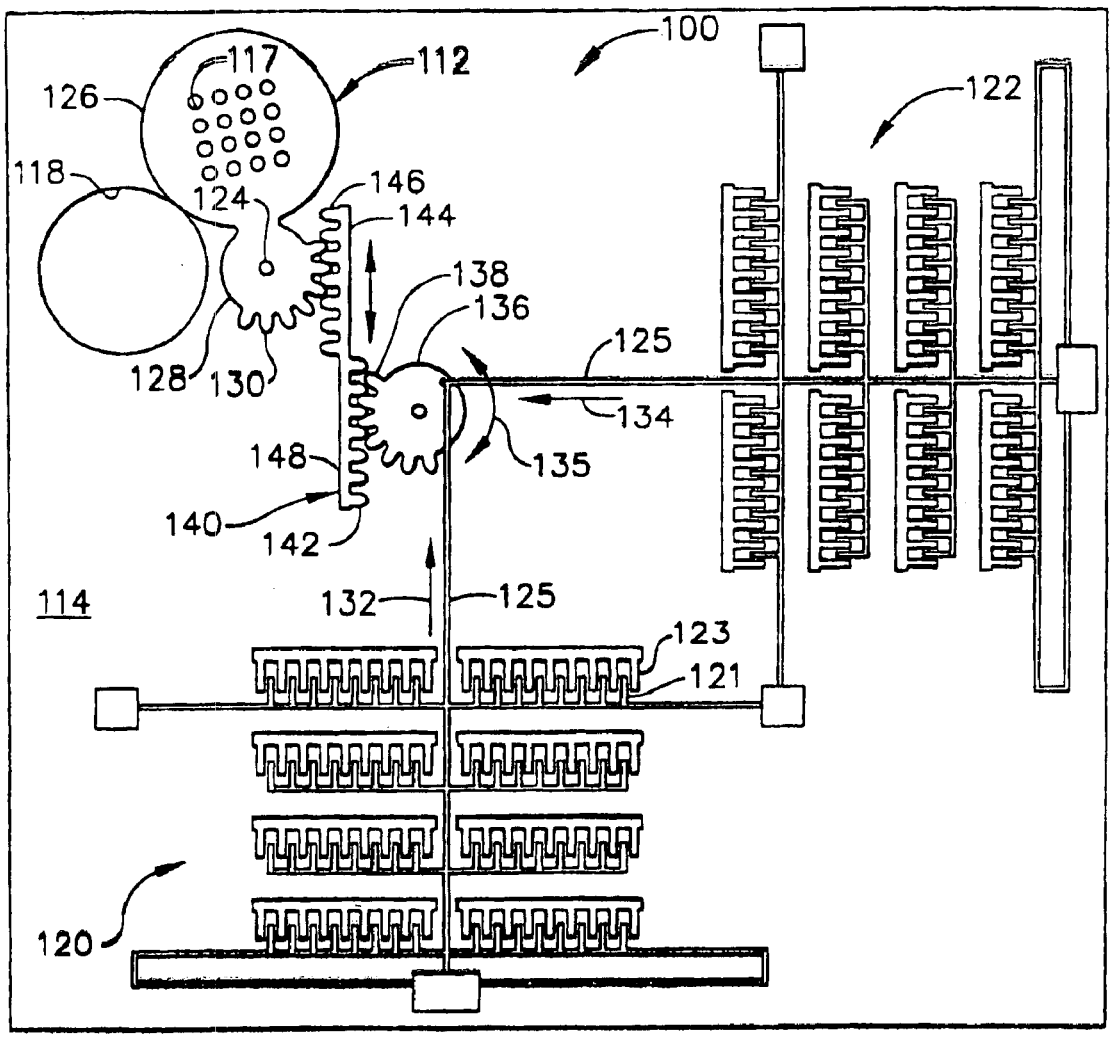
FIG. 8 is a schematic top view of the microvalve depicted in FIG. 7, where the shutter is in the open position.

A second embodiment of the microvalve of the present invention, indicated generally by reference numeral 100, is depicted in FIGS. 5–10. As seen therein, microvalve 100 is configured similar to microvalve 10 so as to include a shutter 112 located adjacent to and substantially parallel with a body portion 114, where body portion 114 preferably has at least one opening 118 formed therein. Microvalve 100 further includes a drive mechanism, to be discussed in greater detail hereinafter, which pivots shutter 112 with respect to body portion 114 so that shutter 112 is brought into and out of alignment with opening 118 of body portion 114. In this way, microvalve 100 is placed in a closed position and an open position, respectively. As discussed above in microvalve 10, the pivotal movement of shutter 112 involves shutter 112 travelling in an arcuate manner (represented by arrow 116) about a pivot point 124. As seen in FIGS. 5 and 7, shutter 112 is in the closed position (i.e., shutter 112 aligns with opening 118 in body portion 114 so as to substantially prevent fluid flow therethrough) and must pivot in a clockwise motion to be located in the open position depicted in FIGS. 6 and 8. Conversely, shutter 112 must pivot in the counter-clockwise direction to go back to the closed position.

Shutter 112 is preferably substantially circular in shape and includes a main circular portion 126 and a substantially circular portion 128 extending from main circular portion 126 about which shutter 112 is pivoted at pivot point 124. It will be seen that portion 128 includes an opening 133 therein so as to enable pivoting about pivot support 141 and preferably has a plurality of gear teeth 130 located at least partially therearound. Thus, portion 128 is also known herein as a rotation gear. As indicated above with respect to shutter 12, shutter 112 is shown as being circular in configuration, but any shape may be utilized for such shutter 112 provided it aligns with opening 118 in body portion 114 when in the closed position and does not align with such opening 118 when in the open position.

Contrary to the drive mechanism described for microvalve 10, the drive mechanism for microvalve 100 does not impact shutter 112 to cause the pivotal motion. Instead, comb drives 120 and 122 (which are preferably electrostatic in design) are positioned so as to interface with a rotation gear hub 136 having a plurality of gear teeth 138 when caused to move in the directions represented by arrows 132 and 134, respectively. More specifically, it will be appreciated that comb drives 120 and 122 interact with rotation gear hub 136 in a manner like that described in a paper entitled "Surface Micromachined Microengine," by Ernest J. Garcia and Jeffrey J. Sniegowski of Sandia National Laboratories. By interfacing with rotation gear hub 136 in such manner, comb drives 120 and 122 cause rotation gear hub 136 to rotate (as indicated by arrow 135). Similar to impact comb drives 20 and 22, each of comb drives 120 and 122 includes a plurality of suspended ground fingers 121 and a plurality of anchored fingers 123, wherein ground fingers 121 are pulled to anchored fingers 123 when a potential is applied therebetween to create an electrostatic force. Further, beam 125 is provided with each comb drive 120 and 122 in substantially parallel orientation to ground fingers 121 which interfaces with rotation gear hub 136 and moves in the direction of arrows 132 and 134, as applicable. First and second resilient beams 127 and 129 are also connected to beam 125 and are anchored so as to suspend comb drives 120 and 122 (see FIG. 10).

As seen in FIGS. 5 and 6, rotation gear hub 136, through gear teeth 138, interface directly with rotation gear 128 of shutter 112 by means of a plurality of gear teeth 130. In this way, shutter 112 is caused to pivot when rotation gear hub 136 is driven to rotate by comb drives 120 and 122. An alternative embodiment for the drive mechanism of microvalve 100 is the inclusion of a linear gear 140 between rotation gear hub 136 and rotation gear 128. It will be seen from FIGS. 7 and 8 that linear gear 140 has a first set of gear teeth 142 positioned along a first side 144 thereof to interact with gear teeth 138 of rotation gear hub 136 and a second set of gear teeth 146 positioned along a second side 148 thereof to interact with gear teeth 130 of rotation gear 128. Thus, it will be appreciated that linear gear 140 moves up when rotation gear hub 136 rotates clockwise, thereby causing rotation gear 128 to rotate in a counter-clockwise direction and pivot shutter 112 from the open position to the closed position. Correspondingly, linear gear 140 moves down when rotation gear hub 136 rotates counter-clockwise so that rotation gear 128 rotates in a clockwise direction and shutter 112 pivots from a closed position to an open position.

Because both non-impacting drive mechanisms of microvalve 100 are very precise, there is no danger of over-rotation or under-rotation as with microvalve 10. Accordingly, no stoppers are required and partial opening of microvalve 100 is easily accomplished. This approach to driving shutter 112 also is able to overcome certain torque issues present in microvalve 10.

Figure 9:
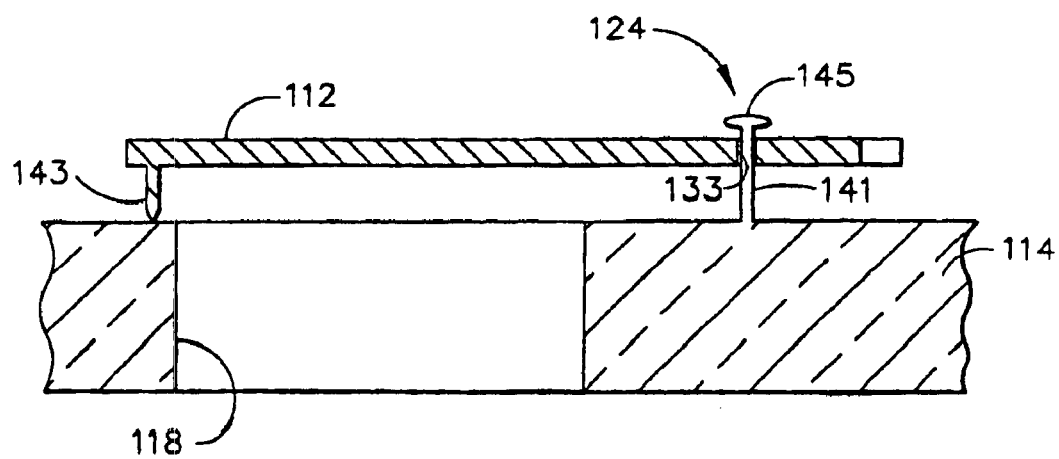
FIG. 9 is a schematic side view of the microvalve depicted in FIGS. 5–8.
Figure 10:
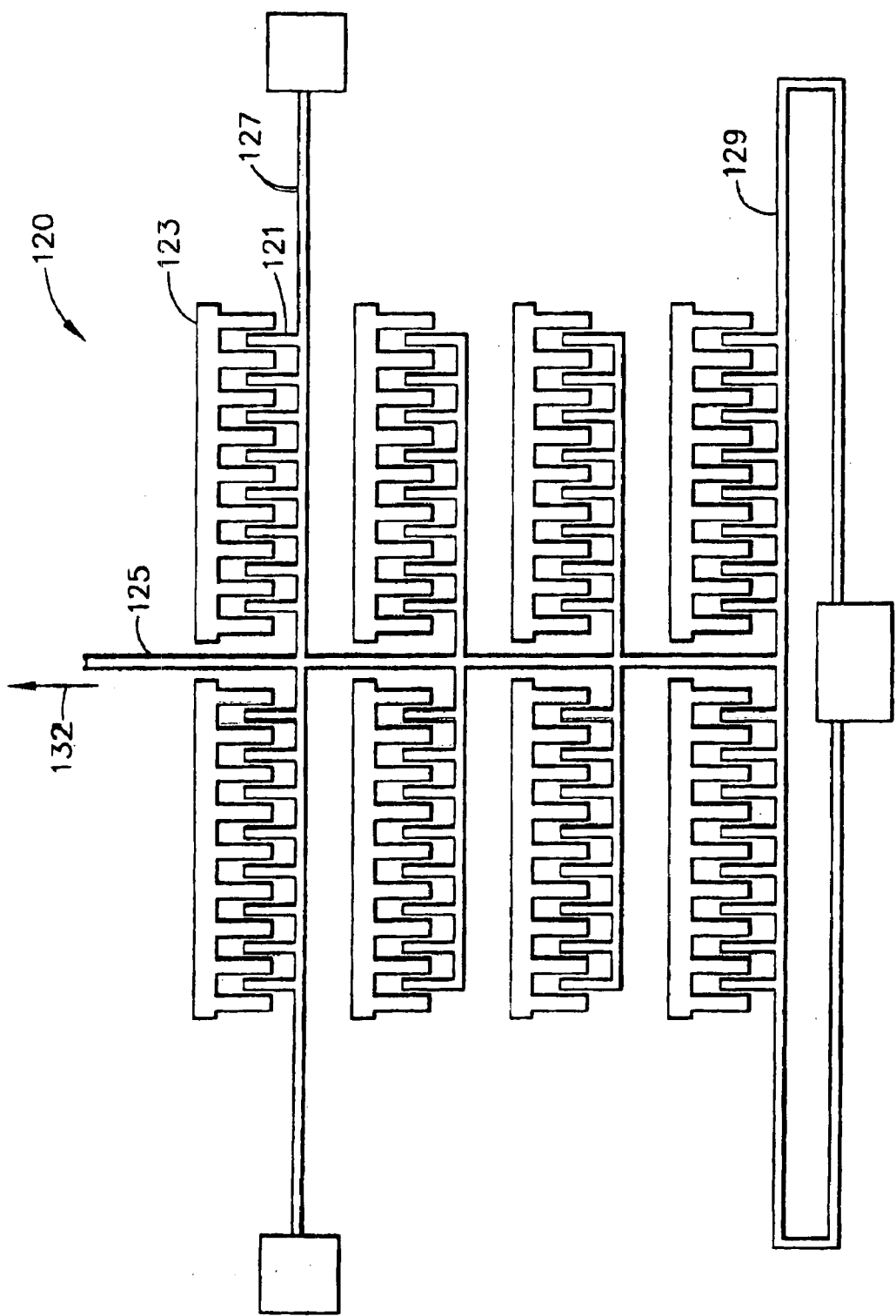
FIG. 10 is an enlarged schematic view of one of the comb drives depicted in FIGS. 5–8.

It will be appreciated from FIG. 9 that shutter 112, like shutter 12, is pivotable about pivot point 124, where it is supported by a pivot support 141. More specifically, rotation gear 128 attached to shutter 112 includes an opening 133 therein which fits over pivot support 141 and is retained in position by a cap 145. Thus, pivot support 141 remains stationary as shutter 112 pivots therearound. Further, a dimple 143 is provided at a distal end of shutter 112 which also serves to restrict air flow between shutter 112 and body portion 114. It will be seen that dimple 143 extends from a lower surface of shutter 112 and is preferably located about the circumference of shutter 112. Shutter 112 also preferably includes a plurality of small openings 117 therein (see FIGS. 6 and 8) like openings 15 in shutter 12. Such openings 117 are likewise sized and configured to maximize the dual functions of providing a predetermined leakage flow and an access path for permitting acid to release an oxide layer between shutter 112 and body 114.

In operation, microvalve 100 is electrostatically actuated between a first (closed) position and a second (open) position by creating an electrostatic force between ground fingers 121 and anchored fingers 123 in comb drives 120 and 122 so that beam 125 causes rotation gear hub 136 to rotate with force sufficient to rotate rotation gear 128 a desired amount (either directly or via linear gear 140). The rotation of rotation gear 128 then causes shutter 112 to pivot clockwise about pivot point 124 into the open position. Microvalve 100 is electrostatically actuated from the open position to a closed position by creating an electrostatic force between ground fingers 121 and anchored fingers 123 in comb drives 120 and 122 so that beam 125 operates rotation gear hub 136 with force sufficient to rotate rotation gear 128 a desired amount so that shutter 112 pivots counter-clockwise about pivot point 124 into the closed position. Likewise, this may occur through direct interaction as shown in FIG. 6 or indirectly by moving linear gear 140 a desired distance linearly in the upward direction.

One aspect of the present invention is directed to an electrostatically-driven MEMS microvalve that may be used to control fluid (gas or liquid) flow into and/or out of a battery, a battery including such a valve, or a method of controlling fluid flow into and/or out of a battery. The battery may include, for example, one or more metal-air cells, one or more fuel cells, one or more voltaic cells, or a combination of these to produce a hybrid cell. In each case, the fluid flow enables or assists the provision of electrical power by providing a fluid cathode such as in the case of a metal-air cell, by providing a fluid anode in the case of a fuel cell, or by providing a fluid electrolyte such as in the case of a voltaic cell used in seawater.

Figure 11:
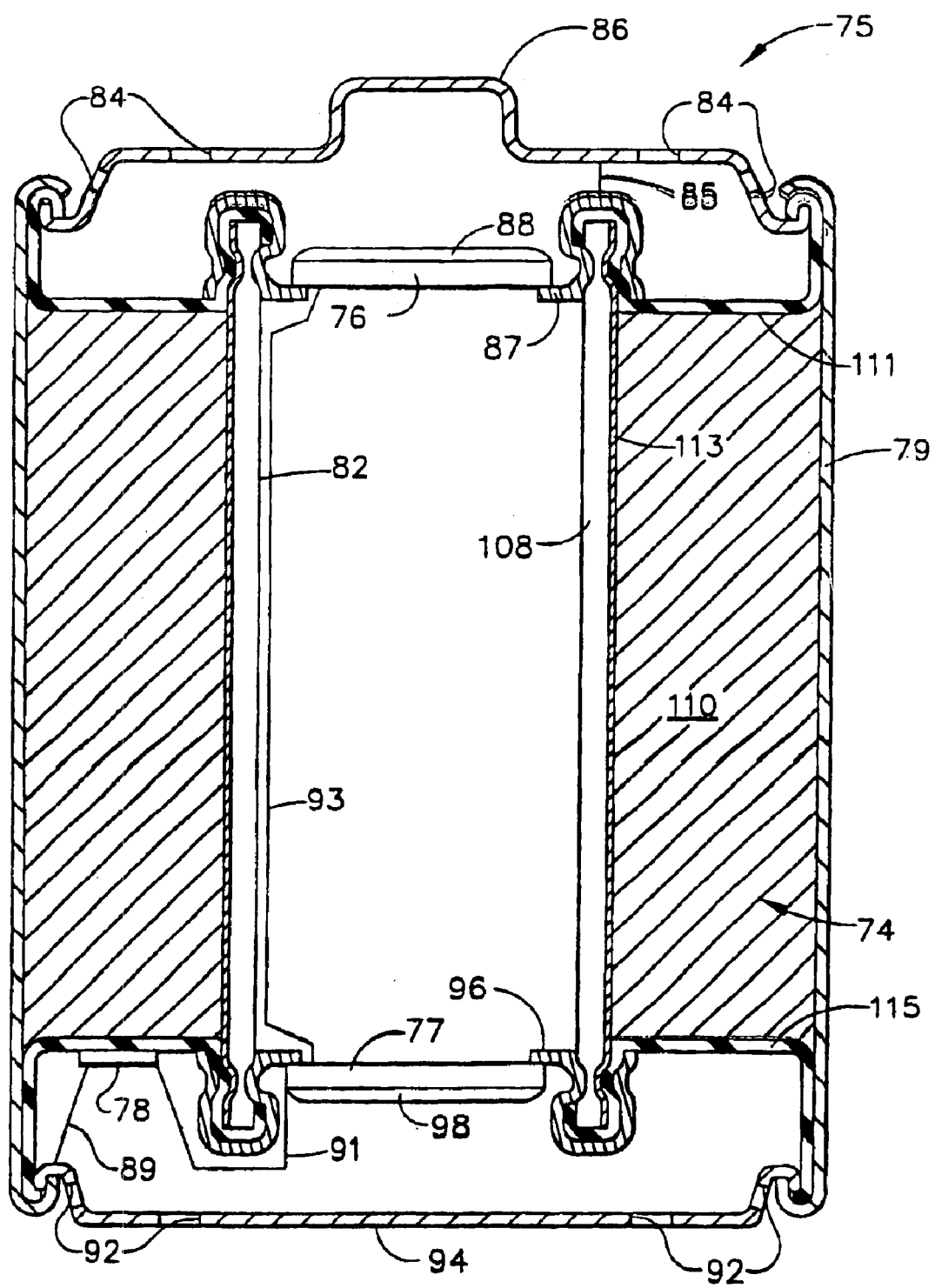
FIG. 11 is a schematic cross-sectional view of a metal-air battery including at least one microvalve of the present invention to control flow of air to the cells therein.
Figure 12:
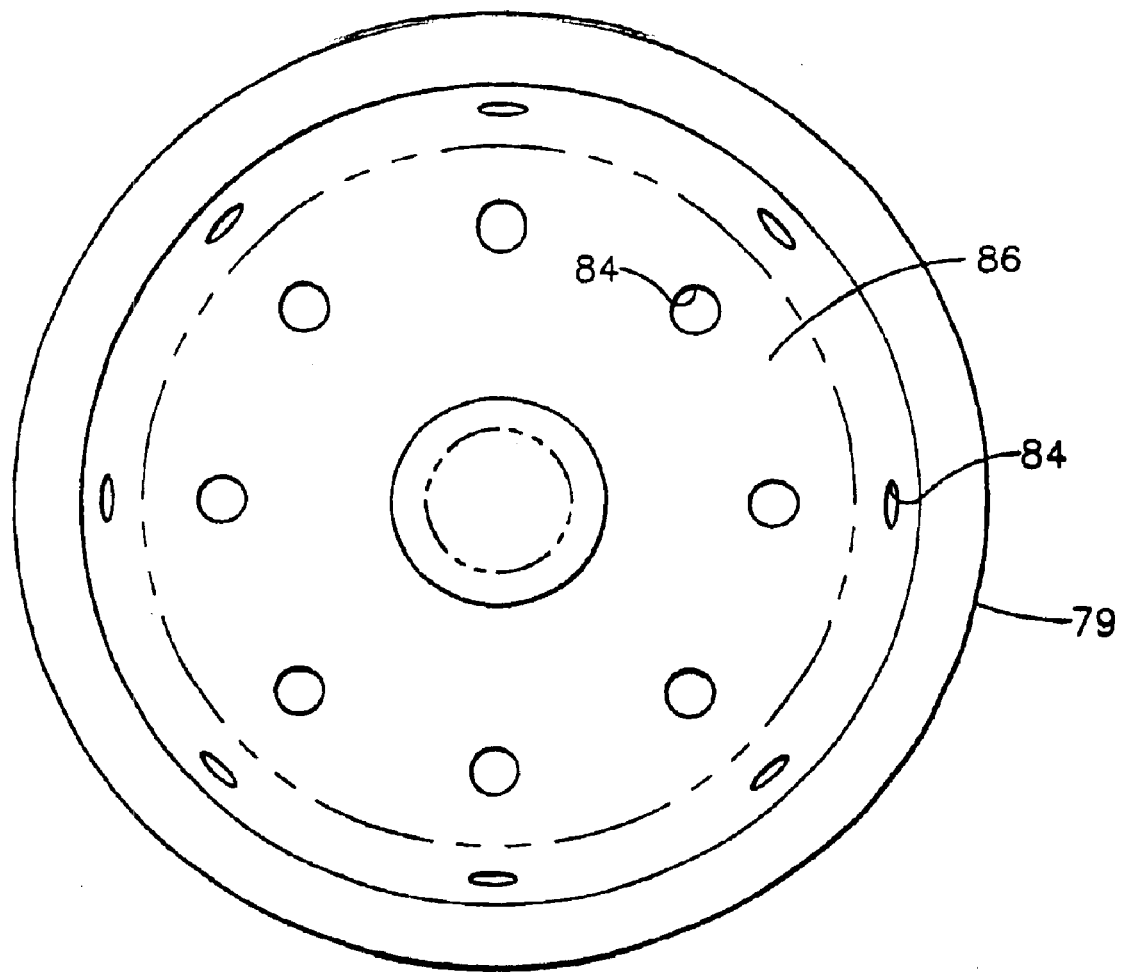
FIG. 12 is a top view of the metal-air battery depicted in FIG. 11.

FIG. 11 shows a cross-section of an exemplary fluid-breathing voltaic battery 75 having a container 79 and at least one voltaic cell 74 disposed within container 79. Container 79 may have a cylindrical shape as shown, a prismatic shape, or even a flat round shape (i.e., a button cell). A fluid exchange system for battery 75 includes at least one microvalve of the present invention (designated by numeral 76) and a controller 78 electrically connected thereto to control the flow of fluid in battery 75. It will be understood that controller 78 is preferably like that described in a patent application entitled "Battery Having a Built-in Controller," filed on Apr. 2, 1998 and having Ser. No. 09/054,012, which is hereby incorporated by reference. Microvalve 76 may be located adjacent a top portion of an air path 82 in battery 75. Microvalve 76 is retained in position by a valve seat 87 (which also preferably includes a portion for crimping a top seal 111) and preferably has a hydrophobic layer 88 (e.g., polytetrafluoroethylene or polypropylene) located between it and openings 84 in a top metal cover 86 to diffuse air entering path 82. A plurality of openings 84 are preferably spaced circumferentially in top metal cover 86 (see FIG. 12), in such quantities and size as needed for a desired air flow into battery 75.

A second microvalve 77 may be located adjacent a bottom portion of air path 82 so as to control air flow entering from openings 92 in a bottom metal cover 94. Microvalve 77 is likewise retained in position by a valve seat 96 (which, like valve seat 87, preferably includes a portion for crimping a bottom seal 115) and preferably has a hydrophobic layer 98 located between it and openings 92 to diffuse air entering path 82. While hydrophobic layers 88 and 98 are shown as being located on only one side of microvalves 76 and 77, several additional or alternative locations are also possible. For example, hydrophobic layers could be placed on both sides of each microvalve 76 and 77 in order to limit the flow of water vapor into or through each microvalve. Additionally, hydrophobic layers could be placed in substantial alignment with openings 84 and 92 in top and bottom metal covers 86 and 94, respectively. It will also be understood that materials for removing carbon dioxide could be incorporated in the same positions as the hydrophobic membranes.

Controller 78 is preferably positioned at the negative end of the cell since both positive and negative battery connections are readily accessible at this location. While controller 78 is preferably electrically connected to both microvalve 76 and microvalve 77 (and any other microvalves in battery 75), a separate controller for each microvalve may be utilized. A controller located at the positive end of the cell, however, would require a line to be run from the negative end of the cell to provide a negative connection. Several other alternative locations are possible for controller 78, including the inner surface of top or bottom metal covers 86 and 94, on top of valve seats 87 and 96, or even incorporated in microvalves 76 and 77 themselves.

It will be understood that connections are necessary between the positive and negative terminals of battery 75, microvalves 76 and 77, and controller 78. Of course, valve seats 87 and 96 for microvalves 76 and 77, respectively, are preferably metal assemblies which carry the positive battery charge. A wire connection 85 is preferably provided between top metal cover 86 and valve seat 87, because lowering top metal cover 86 and spot welding it to valve seat 87 could inhibit air flow from openings 84 to air path 82 unless additional measures were taken (i.e., if openings in top metal cover 86 were located in a middle region above hydrophobic layer 88 or if top metal cover 86 was constructed from a metal screen, perforated metal, or expanded metal). Wire connections 89, 91 and 93 are then provided between the negative terminal for battery 75 and controller 78, between controller 78 and microvalve 77, and between microvalve 77 and microvalve 76, respectively.

It will be appreciated that additional microvalves, preferably in the form of an array, may be positioned within battery 75 as an alternative manner of controlling the amount of air entering therein. In this way, the amount of airflow (dependent upon the number of microvalves open) permitted to flow therein is able to provide a high current rate without continued exposure to ambient air after the load has been removed. Since the microvalves for such an array can be of a bi-stable design (i.e., open or closed), this is an attractive alternative to having microvalve 76 and/or microvalve 77 be only partially open. Although not shown, one or more microvalves for battery 75 may be located adjacent a periphery of container 79.

The terms "electrically connected" and "electrical connection" refer to connections that allow for continuous current flow. The terms "electronically connected" and "electronic connection" refer to connections in which an electronic device such as a transistor or a diode are included in the current path. "Electronic connections" are considered in this application to be a subset of "electrical connections" such that while every "electronic connection" is considered to be an "electrical connection," not every "electrical connection" is considered to be an "electronic connection."

It will further be seen that voltaic cell 74 of battery 75 preferably includes an air cathode 108, a metal anode 110, and a separator 113 therebetween. Seals 111 and 115 of an insulating material are provided at each end of voltaic cell 74, with valve seats 87 and 96, respectively, being in contact with air cathode 108. Another hydrophobic layer may be located between air path 82 and air cathode 108 if necessary. Of course, other battery configurations may employ the microvalves described herein, including one where the anode is a cylindrical plug in the center of the cell surrounded by an air cathode on the outside. Another alternative design involves the anode and air cathode being configured in a spiral or "jelly roll" configuration. It will be understood that other modifications may be required in order to employ these alternative battery designs, such as including an air channel between the container and the air cathode and having openings formed in a side portion of the case instead of the ends.

Controller 78 individually, or in conjunction with a second controller, is preferably utilized to open and/or close microvalves 76 and 77. The term "controller" as used in this application refers to a circuit that accepts at least one input signal and provides at least one output signal that is a function of the input signal. Controller 78 may monitor and/or manage fluid flow between a metal-air electrochemical cell and the external environment. For example, controller 78 may allow air into voltaic cell 74 when oxygen is required to provide the current required by the load. When the load is disconnected or demands only a minimal amount of current, controller 78 may close or partially close microvalves 76 and 77 so that the reaction in voltaic cell 74 is stopped or slowed down and the cell is protected until the load demands more current. At that time, controller 78 may open microvalve 76 so that voltaic cell 74 will generate the current demanded by the load. In this regard, it will also be appreciated that voltaic cell 74 preferably provides power to microvalves 76 and 77 and is able to do so due to the leakage flow therethrough even when in the closed position. Optimally, controller 78 and/or a second controller will provide signal conditioning to the power provided by voltaic cell 79 to drive microvalves 76 and 77.

Controller 78 may also be used to perform other functions to further increase the operation efficiency and/or safety of one or more electrochemical cells in addition to controlling fluid flow into and/or out of one or more electrochemical cells. Examples of operations that may be performed by controller 78 include: using a DC/DC converter to extend the service run time of the battery; controlling a charge cycle of the electrochemical cell by directly monitoring the electrochemical properties of that particular cell; providing a safety disconnect in the event of overheating, inverse polarity, short-circuit, over-pressure, overcharge, over-discharge or excessive hydrogen generation; and, monitoring the state of charge of that particular electrochemical cell to provide this information to the user, the device, or for quality assurance purposes. Functions such as these are described in detail in co-pending U.S. application Ser. Nos. 09/054,012 and 09/054,087, each entitled "Battery Having a Built-in Controller" and filed on Apr. 2, 1998, which are both incorporated by reference in this application.

While particular embodiments and/or individual features of the present invention have been illustrated and described, it would be obvious to those skilled in the art that various other changes and modifications can be made without departing from the spirit and scope of the invention. Further, it should be apparent that all combinations of such embodiments and features are possible and can result in preferred executions of the invention.

What is claimed:

1. A microvalve for controlling fluid flow, comprising:
   (a) a body portion having at least one opening formed therein;
   (b) a shutter located adjacent to and substantially parallel with said body portion; and
   (c) a drive mechanism for causing said shutter to pivot with respect to said body portion so that said shutter is brought into and out of alignment with said opening of said body portion wherein said microvalve is in a closed position and an open position, respectively; and wherein said drive mechanism causes said shutter to pivot by impacting a portion of said shutter.

2. The microvalve of claim 1, further comprising a first stopper to limit pivoting of said shutter in a clockwise direction.

3. The microvalve of claim 1, further comprising a second stopper to limit pivoting of said shutter in a counter-clockwise direction.

4. The microvalve of claim 1, said drive mechanism further comprising:
   (a) a first impact comb drive for causing said shutter to pivot in a clockwise direction; and
   (b) a second impact comb drive for causing said shutter to pivot in a counter-clockwise direction.

5. The microvalve of claim 4, said shutter further comprising a portion extending from a periphery thereof which is impacted by said first and second impact comb drives.

6. The microvalve of claim 5, said shutter impact portion being located substantially opposite a pivot point thereof.

7. The microvalve of claim 4, wherein said shutter is impacted by said first and second impact comb drives by a predetermined force so as to control an amount of pivoting by said shutter within a designated range of motion.

8. The microvalve of claim 7, wherein power to operate one of said first and second impact comb drives is provided only during a change in position of said shutter.

9. The microvalve of claim 1, further comprising a dimple extending between said shutter and said body portion, wherein fluid flow is restricted by a contact line between said dimple and said body portion when said microvalve is in said closed position so that a predetermined amount of fluid is able to leak through said microvalve.

10. The microvalve of claim 1, said drive mechanism further comprising:
   (a) at least one actuator;
   (b) a rotation gear hub located adjacent to and operatively connected to said actuator; and
   (c) a rotation gear operatively connected to said rotation gear hub and said shutter;
wherein said rotation gear hub is caused to rotate upon being driven by said actuator so that said rotation gear is caused to rotate said shutter pivots to a desired position with respect to said body portion.

11. The microvalve of claim 10, wherein said shutter is pivotable to a position intermediate said open and closed positions to permit a proportional amount of fluid flow therethrough.

12. The microvalve of claim 10, wherein said rotation gear hub as rotatable clockwise and counter-clockwise so as to pivot said shutter between said open and closed positions.

13. The microvalve of claim 1, further comprising a controller for providing power to said drive mechanism.

14. The microvalve of claim 1, said drive mechanism further comprising:
   (a) least one actuator;
   (b) a rotation gear hub located adjacent to and impacted by said actuator;
   (c) a rotation gear operatively connected to said shutter; and
   (d) a linear gear operatively connected to said rotation gear hub at a first end and operatively connected to said rotation gear at a second end;
wherein said rotation gear hub is caused to rotate upon being driven by said actuator so that said rotation gear is indirectly caused to rotate and said shutter pivots to a desired position with respect to said body portion.

15. The microvalve of claim 14, wherein said shutter is pivotable to a position intermediate open and closed positions to permit a proportional amount of fluid flow therethrough.

16. The microvalve of claim 14, wherein said rotation gear hub is rotatable clockwise and counter-clockwise said shutter between said open and closed positions.

17. A microvalve for controlling fluid flow comprising:
   (a) a body portion having at least one opening formed therein;
   (b) a shutter located adjacent to and substantially parallel with said body portion; and
   (c) a drive mechanism for causing said shutter to pivot with respect to said body portion so that said shutter is brought into and out of alignment with said opening of said body portion, said drive mechanism comprising at least one actuator, a rotation gear hub located adjacent to and operatively connected to said actuator, and a rotation gear operatively connected to said rotation gear hub and said shutter, wherein said rotation gear hub is caused to rotate upon being driven by said actuator so that as said rotation gear is caused to rotate said shutter pivots to a desired position with respect to said body portion and wherein said microvalve is in a closed position and an open position, respectively.

18. The microvalve of claim 17, wherein said shutter is pivotable to a position intermediate said open and closed positions to permit a proportional amount of fluid flow therethrough.

19. A microvalve for controlling fluid flow comprising:
   (a) a body portion having at least one opening formed therein;
   (b) a shutter located adjacent to and substantially parallel with said body portion;
   (c) a drive mechanism for causing said shutter to pivot with respect to said body portion so that said shutter is brought into and out of alignment with said opening of said body portion, said drive mechanism further comprising at least one actuator, a rotation gear hub located adjacent to and impacted by said actuator, a rotation gear operatively connected to said shutter, and a linear gear operatively connected to said rotation gear hub at a first end and operatively connected to said rotation gear at a second end,
wherein said rotation gear hub is caused to rotate upon being driven by said actuator so that said rotation gear is indirectly caused to rotate and said shutter pivots to a desired position with respect to said body portion.

20. The microvalve of claim 19, wherein said rotation gear hub is rotatable clockwise and counterclockwise so as to pivot said shutter between said open and closed positions.

* * * * *

UNITED STATES PATENT AND TRADEMARK OFFICE
CERTIFICATE OF CORRECTION

PATENT NO. : 6,935,609 B2  Page 1 of 1
APPLICATION NO. : 10/777741
DATED : August 30, 2005
INVENTOR(S) : Sherman et al.

It is certified that error appears in the above-identified patent and that said Letters Patent is hereby corrected as shown below:

<u>Column 13,</u>
Line 31, "as" should be -- is --.
Line 36, insert -- at -- before "least".
Line 51, insert -- said -- after "intermediate".

<u>Column 14,</u>
Line 2, insert -- so as to pivot -- after "counter-clockwise".

Signed and Sealed this

Twenty-seventh Day of June, 2006

JON W. DUDAS
*Director of the United States Patent and Trademark Office*